May 28, 1929.  B. KAPLAN  1,715,132
FAUCET
Filed July 11, 1927
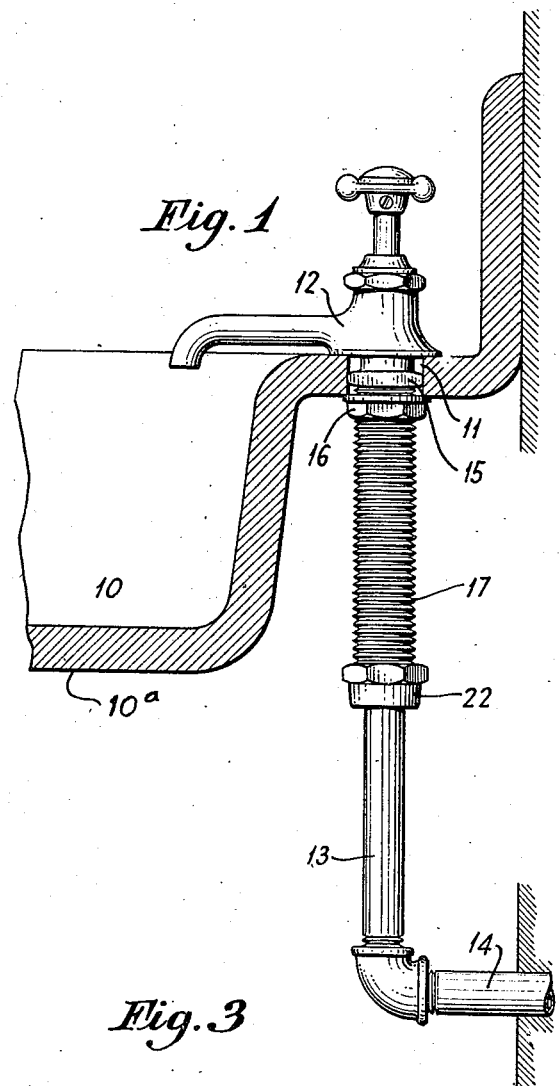
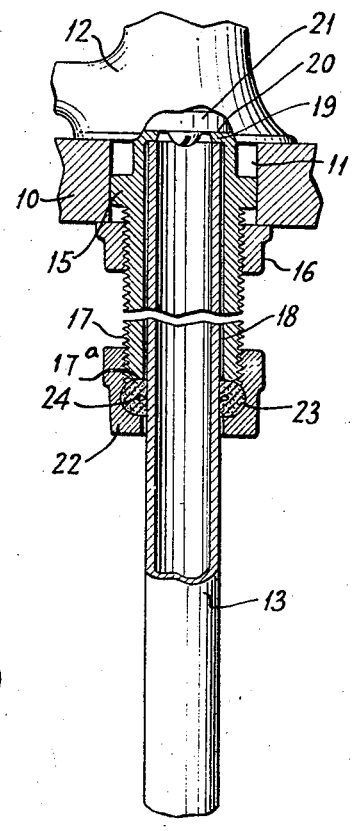
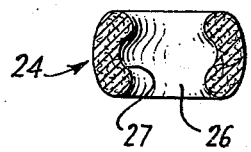
Benjamin Kaplan
INVENTOR
BY
ATTORNEY Patented May 28, 1929.

1,715,132

UNITED STATES PATENT OFFICE.

BENJAMIN KAPLAN, OF BROOKLYN, NEW YORK.

FAUCET.

Application filed July 11, 1927. Serial No. 204,809.

This invention relates to an improvement in faucets and more particularly is directed to the construction thereof which will permit the insertion of the service pipe, generally provided for such faucets, into the body of the faucet, thereby to connect these parts directly without any reduction in the size of said service pipe.

An object of the invention is to provide a construction of a faucet whereby the necessity of using intermediate reducing connections, nipples, unions and the like is avoided, yet affording a strong connection; easily made and cheap in its final construction.

A further object is to provide a faucet having a chamber for the reception of the service pipe generally provided for such faucets, and a means for positively preventing any leakage at the connection of these two members.

A further object of the invention is to provide a new and improved packing member for use in connection with a faucet construction of the type described, designed to take up for any slight angularity between the service pipe leading to such faucet constructions and the faucet itself.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible illustrative embodiments of this invention, Fig. 1 is a side elevational view partly in section disclosing the invention applied to a basin and connected with the service pipe in a manner hereinafter described;

Fig. 2 is a longitudinal sectional view of the service pipe and faucet connection; while Fig. 3 is a view showing the improved packing member in detail.

On the drawing, the basin 10 has mounted in an opening 11 thereof, a faucet 12, connected in the new and improved manner with the service pipe 13 which has direct and unreduced connection with a supply pipe 14 leading to a source of supply (not shown), by means of which water or any other liquid may be delivered to faucet 12 and drained into basin 10.

Generally, in setting up basins and the like, and mounting faucets of the type well known in connection with such basins, it has been found necessary to reduce the size of the service pipe in some manner so that a connection might be made to the faucet. It has also been found that in making these connections, the type of supplies necessarily used are such that, with a slight deviation in the line of connection between an L extending from the wall and connected with the supply pipe and the center line of the faucet, a joint is produced which is not positive in the sense of being liquid tight, and which is weak from the view-point that, by taking up with a wrench, the metal of these connections is placed under great stress at some one point, with resultant shearing of the metal, and the extra expense of replacing the parts.

Also the pipes are of very small cross-section and either have to be made small-walled, in order that the flow of liquid be not restricted in too great a degree, or else are brittle because of their small diameter. Furthermore, in making up such connections, it is necessary either that the plumber or fitter cut his pipe exactly to size or he will have the choice of leaving a poorly finished job with the faucet not resting flush with the basin, if the pipe be too long, or if the pipe is too short, he must cut a new piece of pipe, as otherwise he cannot make his connections. In this construction, however, these defects have been avoided, as hereinafter pointed out.

The faucet 12 is provided with the customary socket member 15 made either square or of some other non-circular cross-section, by which the faucet is positively positioned against rotary movement with respect to the basin 10 when inserted into the opening 11 which conforms in shape to that of socket 15. Then by screwing up on the lock-nut 16, threadedly retained on the nipple 17 of the faucet spud, the faucet is positively retained against either rotary or vertical movement with respect to the basin. This nipple 17 as shown in Fig. 1 is made of such length that its lower end $17^a$ is arranged adjacent the lower surface $10^a$ of basin 10 for a purpose hereinafter described. Said nipple further is constructed in such manner that a passage 18 is provided therethrough, said passage communicating at its upper end 19 with the valve seat 20 upon which is carried the valve 21 of the faucet 12. This passage 18 is of such size that the service pipe 13 may be received therein without reduction. Actually, a slight clearance is allowed between the walls of the passage 18 and the external wall of the service pipe 13.

Carried at the lower end 17ª of the nipple 17 and threadedly engaged therewith is the gland 22, provided with a cut-out surface portion 23 in which is adapted to be seated the new and improved packing member 24 hereinafter described. By rotating the gland 22 in proper manner, the packing 24 will be compressed between the end 17ª of nipple 17 and the surface 23 of the gland into contact with the wall of the service pipe 13, thus providing a liquid-tight joint at this point. The position of gland 22, due to the length of nipple 17 is such that a wrench may easily be applied thereto without discomfort to the mechanic in tightening up on the packing.

The packing 24 is made up in ellipsoidal form and is provided with an opening 26 therethrough, this opening being of such size that the service pipe 13 will be received therethrough without any friction, that is, the packing member 24 will be freely slidable along the pipe so that a space would normally be presented between the internal surface 27 of the packing member and the external surface of the pipe 13. When the gland 22 is tightened up on this packing member, the packing member will be forced together and out against the pipe 13 in providing this liquid-tight joint. This packing member is made of any elastic material so that the function described will be carried out.

By the provision of these different parts, even if the center line of faucet 12 were not directly aligned with that of the pipe 13, still by the small clearance between the pipe 13 and the internal surface of the passage 18, a slight "play" is allowed. In addition thereto, the new packing member 24 takes up for any deviation of center lines in respect to the gland 22 so that no strain will be applied to this gland. All these factors enter into providing a construction easy to manufacture, with parts of heavy material, without danger of breaking, in the operation or assembly, yet providing highly efficient connections.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

In combination with a faucet spud having a nipple, a service pipe received in said nipple, a packing gland carried by said nipple and having a packing member for making a liquid-tight joint with said service pipe, the internal diameters of said gland and nipple being greater than the external diameter of said service pipe.

In testimony whereof I affix my signature.

BENJAMIN KAPLAN.